METHOD OF PREPARING A FILM RESISTOR BY SPUTTERING A TERNARY ALLOY OF TIN, ANTIMONY AND INDIUM IN THE PRESENCE OF OXYGEN

Filed June 3, 1965

INVENTORS W. R. SINCLAIR
D. W. STILLINGER
BY Edward M. Fink
ATTORNEY

United States Patent Office 3,388,053
Patented June 11, 1968

3,388,053

METHOD OF PREPARING A FILM RESISTOR BY SPUTTERING A TERNARY ALLOY OF TIN, ANTIMONY AND INDIUM IN THE PRESENCE OF OXYGEN

William R. Sinclair and Donald W. Stillinger, Summit, N.J., assignors to Bell Telephone Laboratories, Incorporated, New York, N.Y., a corporation of New York Filed June 3, 1965, Ser. No. 460,994
5 Claims. (Cl. 204—192)

This invention relates to a technique for the preparation of electrically conductive tin oxide films. More particularly, the present invention is directed to a technique for controlling the temperature coefficient of resistance of tin oxide films doped simultaneously with the oxides of indium and antimony and prepared by reactive sputtering.

Recently, considerable interest has been generated in a class of conductive films comprising tin oxide alone or in combination with the oxide of indium or antimony. Resistors comprising electrically conductive films of this type provide distinct advantages over certain other types of resistors for several reasons, namely, resistance to mechanical damage, high temperature operation, et cetera. Perhaps the most significant problem now encountered with sputtered films of the noted type is the variation in temperature coefficient of resistance, hereinafter designated "T.C.R.," as a function of composition.

The most useful range of T.C.R. for circuit purposes is from −500 p.p.m./° C. to +500 p.p.m./° C. Unfortunately, variations in T.C.R. in this useful range as a function of changing composition are significant. Compositional fluctuations are inevitable and may be attributed to either the randomizing effect of the sputtering procedure or the fact that the compositions are thermodynamically unstable due to excesses of antimony beyond the solubility limit. Accordingly, workers in the art have long sought a procedure for reducing the sensitivity of the T.C.R. of antimony doped tin oxide films to compositional changes in order to enhance reproducibility over the range of interest.

In accordance with the present invention, the prior art difficulty delineated above is effectively overcome by depositing a thin film of tin oxide containing both indium and antimony oxide upon a substrate by reactive sputtering of a ternary alloy having the general formula $Sn_xSb_yIn_z$ wherein $x$ ranges from 96.6–84.0 atomic percent, $y$ ranges from 3.3–15 atomic percent, and $z$ ranges from 0.1 to 1 atomic percent.

Figure 2:
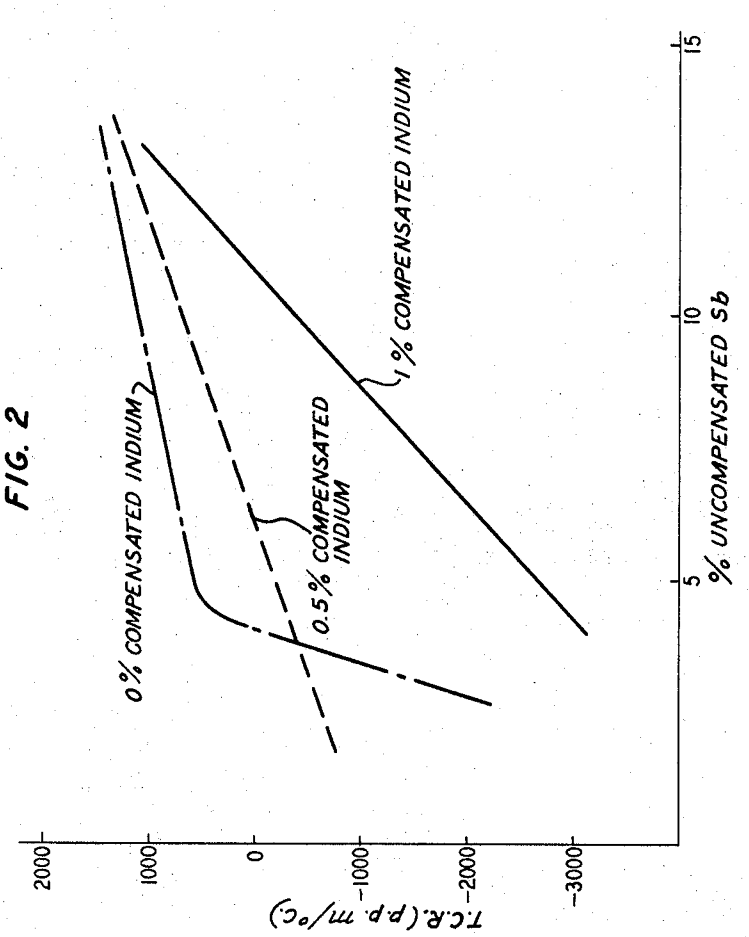
Figure 1:
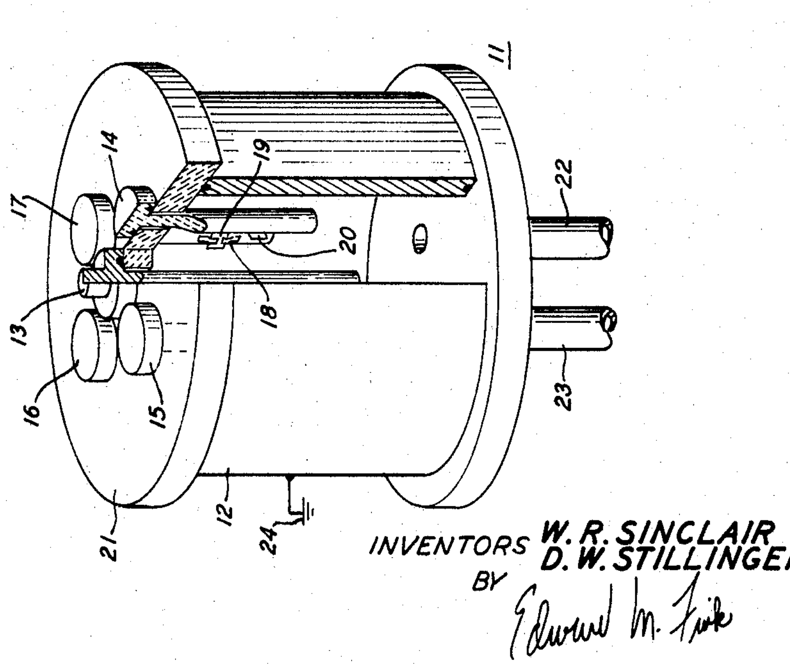

Other advantages of the present invention will become apparent from the following detailed description taken in conjunction with the accompanying drawing wherein:

FIG. 1 is a front elevational view, partly in section, of an apparatus suitable for use in the practice of the present invention; and FIG. 2 is a graphical representation on coordinates of T.C.R. in p.p.m./° C. against atom percent uncompensated antimony showing variations in T.C.R. as a function of varying composition for both the prior art compositions and those of the invention.

With reference now more particularly to FIG. 1, there is shown an apparatus suitable for simultaneously depositing a thin film of the oxides of tin, antimony and indium. Shown in the figure is a vacuum chamber 11 having an aluminum pipe anode 12 and cathode 13. Cathode 13 may be composed of a ternary alloy of tin, antimony and indium having the general formula $Sn_xSb_yIn_z$ wherein $x$ ranges from 96.6–84 atom percent, $y$ ranges from 3.3–15 atom percent and $z$ ranges from 0.1–1 atom percent. The use of compositions not within the stated ranges fails to result in the desired control of T.C.R.

Referring again to the figure, shown disposed within chamber 11 are substrate holders 14, 15, 16 and 17 having means 18 for attaching a substrate 19, 20, et cetera, thereto. Preferred substrate materials for the purpose of this invention are glass, ceramics, et cetera. Cathode 13 and substrate holders 14, 15, 16 and 17 are supported by means of a Pyrex plate cap 21 which hermetically seals the apparatus. Provision is made for evacuating chamber 11 via conduit 22 and for admitting a mixture of argon and oxygen or oxygen alone, via conduit 23, during the sputtering process. Cathode 13 and anode 12, which are electrically insulated by means of cap 21, are biased by source 24.

In the operation of the process, vacuum chamber 11 is first evacuated, flushed with an inert gas, as, for example, any of the members of the rare gas family such as helium, argon or neon and the chamber then re-evacuated. The extent of the vacuum is dependent upon consideration of several factors.

Increasing the inert gas pressure and thereby reducing the vacuum within chamber 11 increases the rate at which the material being sputtered is removed from the cathode and, accordingly, increases the rate of deposition. The maximum pressure is usually dictated by power supply limitations since increasing the pressure also increases the current flow between anode 12 and cathode 13. A practical upper limit in this respect is 100 microns of mercury for a sputtering voltage of 2000 volts.

After the system has been pumped down, oxygen or oxygen plus argon is admitted into the system via conduit 23. In this manner, the pressure is maintained within the range of 10 to 100 microns of mercury.

Next, cathode 13, which may be composed of tin, antimony and indium in the noted amounts, is made electrically negative with respect to anode 12. The minimum voltage necessary to produce sputtering is of the order of a few volts direct-current. However, for the particular geometry utilized in describing the present invention, it is preferred to employ a sputtering voltage within the range of 1500–2000 volts, a pressure within the range of 30–50 microns of mercury and a current ranging from 50–100 milliamperes.

The spacing between anode and cathode is not critical. However, for the best efficiency during the sputtering step, substrates 19, 20 et cetera should be positioned immediately without Crooke's Dark Space, approximately 2 inches from the cathode.

With reference now, more particularly, to the example under discussion, by employing a proper voltage, pressure and spacing of the various elements within the vacuum chamber, a film of tin oxide doped simultaneously with indium and antimony is deposited upon the substrates. Sputtering is conducted for a time period calculated to produce the desired thickness.

For the purposes of this invention, the thickness of this layer is within the range of 10 to 100,000 angstroms, such thicknesses being of interest in resistor use. The resultant film as deposited is a glassy nonconductor and must subsequently be treated by heating in order to obtain the desired film.

Following, the assembly is inserted into a furnace and heated in air at temperatures within the range of 600–1000° C. for a time period of the order of 15 to 180 minutes, so resulting in the desired conductive film. Heating at temperatures below the indicated minimum does not result in the desired end whereas the use of temperatures appreciably beyond 1000° C. causes reactions between the oxide film and the substrate. All that remains in the preparation of a resistor is the application of suitable electrodes. This may be accomplished by applying a suitable silver paste at both ends of the assembly and firing at temperatures of the order of 500° C. It is to be understood that the electrodes may be attached in any manner well known to those skilled in the art.

With further reference now to FIG. 2, there is shown a graphical representation on coordinates of T.C.R. in p.p.m./° C. against uncompensated antimony in atom per cent showing the sensitivity of the T.C.R. as a function of varying composition. In order to demonstrate the superiority of the described compositions over those of the prior art, three curves were plotted, (a) antimony doped tin oxide containing 0 atom percent compensated indium, (b) antimony doped tin oxide containing 0.5 atom percent compensated indium and (c) antimony doped tin oxide containing 1 atom percent compensated indium. The term "compensated indium" refers to equal additions of both indium and antimony. Thus, for a 0.5 atom percent compensated indium composition, 0.5 atom percent antimony and indium have been added to the antimony doped tin oxide base composition, et cetera.

It is noted that the curve representing the uncompensated indium composition (prior art) manifests a variation in T.C.R. from +500 to −500 p.p.m./° C. over a range of antimony composition of less than 1 atom percent, so indicating a high degree of sensitivity to compositional fluctuation. However, a similar variation in T.C.R. for a 0.5 atom percent compensated indium composition occurs over a composition fluctuation of approximately 6 atom percent, so indicating a marked improvement in sensitivity. Similarly, a 1 atom percent compensated indium composition manifests a variation in T.C.R. (over the desired range) over a compositional fluctuation of more than 2.5 atom percent. It has been determined that sensitivity of the T.C.R. can be adequately controlled over the desired range as compensated indium varies from 0.1 to 1.0 atom percent. Variation above or below the noted range fails to enhance sensitivity of the T.C.R.

It will further be understood that the main impact of the present invention lies in the discovery that the T.C.R. of tin oxide films can be controlled within the limits of a useful range by simultaneous doping with indium and antimony oxide. Heretofore, only antimony doped tin oxide films obtained by reactive sputtering were known conductors, the indium doped films being nonconductive in the absence of carbon.

Several examples of the present invention are described in detail below. The examples and the general procedure described above are included merely to aid in the understanding of the invention, and variations may be made by one skilled in the art without departing from the spirit and scope of the invention.

Example I

A sputtering apparatus similar to that shown in FIG. 1 was employed to reactively sputter a film of tin oxide simultaneously doped with the oxides of indium and antimony upon fused silica substrates. The sputtering electrode was a rod ⅝" in diameter and 6" in length comprising 94.55 atom percent tin, 4.95 atom percent antimony and 0.50 atom percent indium obtained from commercial sources, the purity thereof being 99.9 percent. In the apparatus employed, the anode was grounded, the potential difference being obtained by making the cathode negative with respect to ground.

The vacuum chamber was initially evacuated to a pressure of the order of one micron of mercury, flushed with argon and oxygen and re-evacuated to 30 microns of mercury with the argon and oxygen flowing into the chamber.

The anode and cathode were spaced approximately 2 inches apart, the substrates being placed therebetween at a position immediately without Crooke's Dark Space. A direct-current voltage of approximately 1800 volts was impressed between the anode and cathode. Sputtering was conducted for 120 minutes, producing an oxidized coating 3500 angstroms thick upon the silica substrates.

Next, the substrates were inserted into a furnace and heated to a temperature of 710° C. for 60 minutes. Finally, silver paste comprising finely dissolved silver and 8 weight percent of a lead borosilicate glass suspended in amylacetate and Cellosolve acetate was applied at opposite ends of each substrate and dried at 500° C. Resistance measurements were then made in a furnace as a function of temperature from room temperature to 300° C. and back to room temperature employing a Wheatstone bridge and a thermocouple in accordance with conventional techniques. The average T.C.R. for the samples tested from 25–300° C. in p.p.m. was −300.

Example II

The procedure of Example I was repeated employing a sputtering electrode comprising 89 atom percent tin, 10.5 atom percent an timony and 0.5 atom percent indium. The average T.C.R. for the samples tested from 25–300° C. in p.p.m. was +500.

Example III

The procedure of Example I was repeated employing a sputtering electrode comprising 88 atom percent tin, 11 atom percent antimony and 1 atom percent indium. The average T.C.R. for the samples tested from 25–300° C. in p.p.m. was −200.

Example IV

The procedure of Example I was repeated employing a sputtering electrode comprising 86 atom percent tin, 13.5 atom percent antimony and 0.5 atom percent indium. The average T.C.R. for the samples tested from 25–300° C. in p.p.m. was +1300.

What is claimed is:

1. A method for the fabrication of a resistive oxide film which comprises the steps of reactively sputtering a ternary alloy having the general formula $Sn_xSb_yIn_z$ wherein $x$ ranges from 96.6–84.0 atomic percent, $y$ ranges from 3.3–15 atomic percent and $z$ ranges from 0.1–1 atomic percent, upon a substrate in the presence of oxygen and heating the resultant assembly at a temperature within the range of 600–1000° C.

2. A method in accordance with claim 1 wherein said alloy consists essentially of 94.55 atomic percent tin, 4.95 atomic percent antimony and 0.50 atomic percent indium.

3. A method in accordance with claim 1 wherein said alloy consists essentially of 89 aotmic percent tin, 10.5 atomic percent antimony and 0.5 atomic percent indium.

4. A method in accordance with claim 1 wherein said alloy consists essentially of 88 atomic percent tin, 11 atomic percent antimony and 1 atomic percent indium.

5. A method in accordance with claim 1 wherein said alloy consists essentially of 86 atomic percent tin, 13.5 atomic percent antimony and 0.5 atomic percent indium.

References Cited

UNITED STATES PATENTS

| | | | |
|---|---|---|---|
| 3,073,770 | 1/1963 | Sinclair et al. | 204—192 |
| 3,139,396 | 6/1964 | Sinclair | 204—192 |

ROBERT K. MIHALEK, *Primary Examiner.*